United States Patent
Kobayashi et al.

(10) Patent No.: US 9,599,873 B2
(45) Date of Patent: Mar. 21, 2017

(54) LIGHT CONTROL METHOD FOR LIGHT CONTROL ELEMENT

(71) Applicant: National University Corporation Chiba University, Chiba-shi, Chiba (JP)

(72) Inventors: Norihisa Kobayashi, Chiba (JP); Kazuki Nakamura, Chiba (JP); Ayako Tsuboi, Chiba (JP)

(73) Assignee: NATIONAL UNIVERSITY CORPORATION CHIBA UNIVERSITY, Chiba-shi, Chiba (JP)

( * ) Notice: Subject to any disclaimer, the term of this patent is extended or adjusted under 35 U.S.C. 154(b) by 0 days.

(21) Appl. No.: 14/402,983

(22) PCT Filed: May 28, 2013

(86) PCT No.: PCT/JP2013/064761
§ 371 (c)(1),
(2) Date: Sep. 14, 2015

(87) PCT Pub. No.: WO2013/180125
PCT Pub. Date: Dec. 5, 2013

(65) Prior Publication Data
US 2016/0026054 A1    Jan. 28, 2016

(30) Foreign Application Priority Data

May 28, 2012  (JP) ................. 2012-120501

(51) Int. Cl.
*G02F 1/15* (2006.01)
*G02F 1/155* (2006.01)
*G02F 1/163* (2006.01)

(52) U.S. Cl.
CPC ............ *G02F 1/155* (2013.01); *G02F 1/1506* (2013.01); *G02F 1/163* (2013.01)

(58) Field of Classification Search
CPC ........ G02F 1/1506; G02F 1/163; G02F 1/155; G02F 1/153; C09K 9/00
(Continued)

(56) References Cited

U.S. PATENT DOCUMENTS 8,064,119 B2 * 11/2011 Kokeguchi ........... G02F 1/1506
                                                      345/49
2004/0252099 A1 * 12/2004 Walder ..................... B41J 3/407
                                                      345/105

FOREIGN PATENT DOCUMENTS

| JP | 10-500225 A | 1/1998 |
| JP | 2007-086188 A | 4/2007 |
| WO | WO 95/30495 A1 | 11/1995 |

OTHER PUBLICATIONS

"Fabrication and properties of novel silver deposition-based electrochromic cell which shows clear transparent, silver-mirror and black color states" by K. Kobayashi, *Imaging Conference Japan 2011 Fall Meeting*, Dec. 2011, pp. 81-84.

* cited by examiner

*Primary Examiner* — Tuyen Tra
(74) *Attorney, Agent, or Firm* — Flynn, Thiel, Boutell & Tanis, P.C.

(57) ABSTRACT

A light control method for a light control element which can be used even as a transmission-type one, has a high-quality mirror state enabling a high contrast ratio, and enables a display in multiple colors. To this end, in this light control method for a light control element, with respect to a light control element containing a pair of substrates, a pair of electrodes formed on opposed surfaces of the pair of substrates, and an electrolyte layer sandwiched between the pair of electrodes and including an electrochromic material containing silver and a mediator, the applied voltage to be applied between the pair of electrodes is changed in one light control period.

15 Claims, 27 Drawing Sheets

FIG.2
(A)
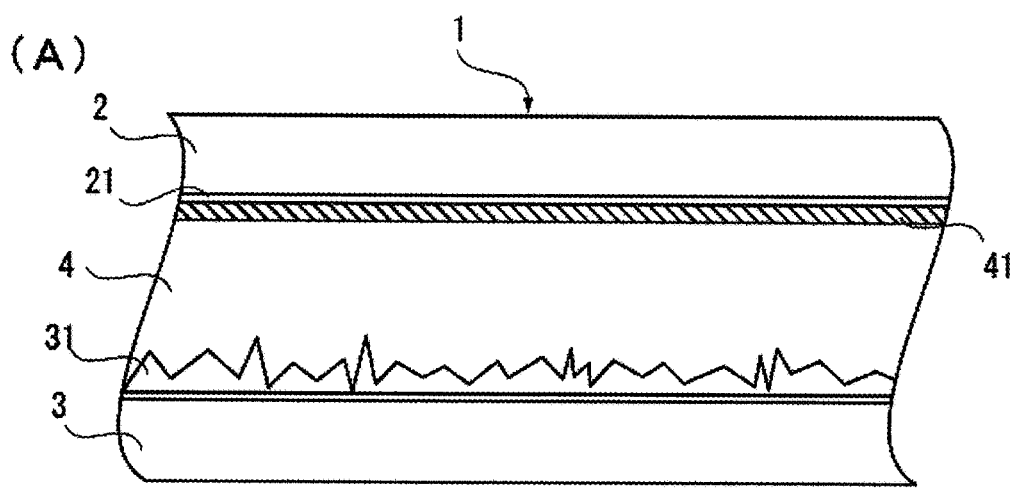
(B)
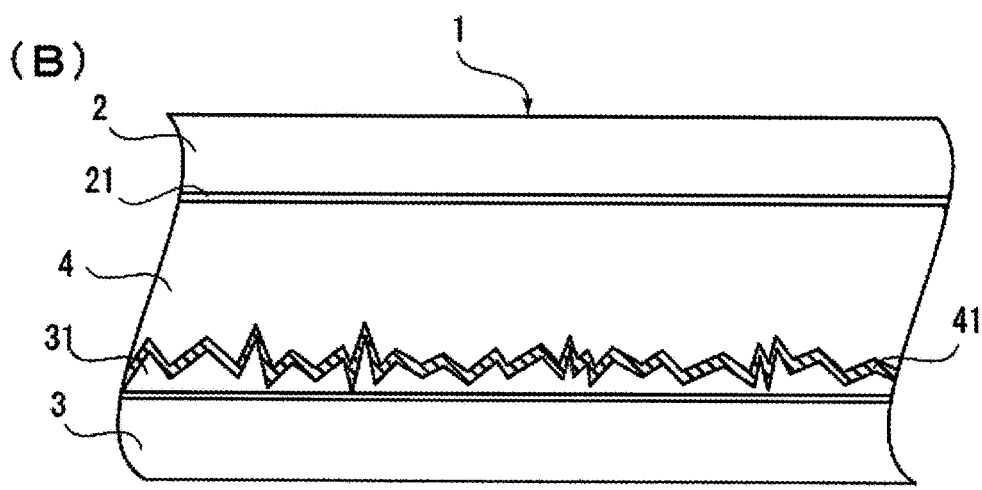

FIG.4
(A)
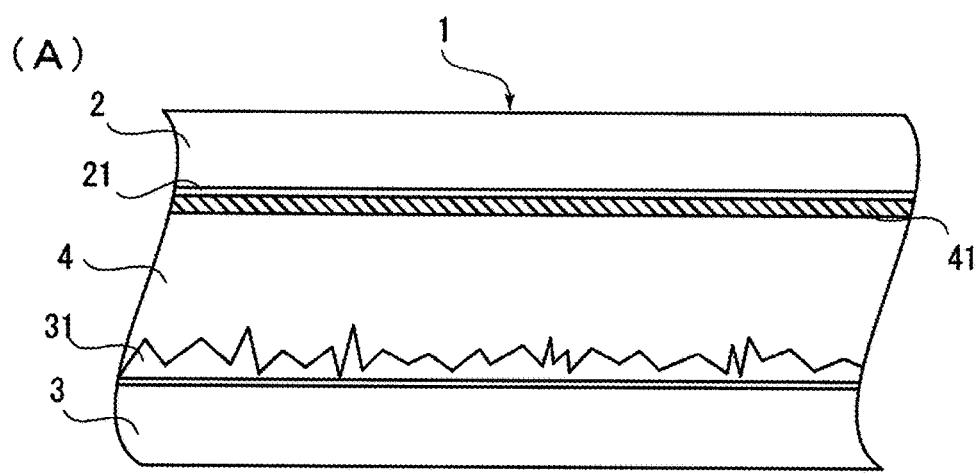
(B)
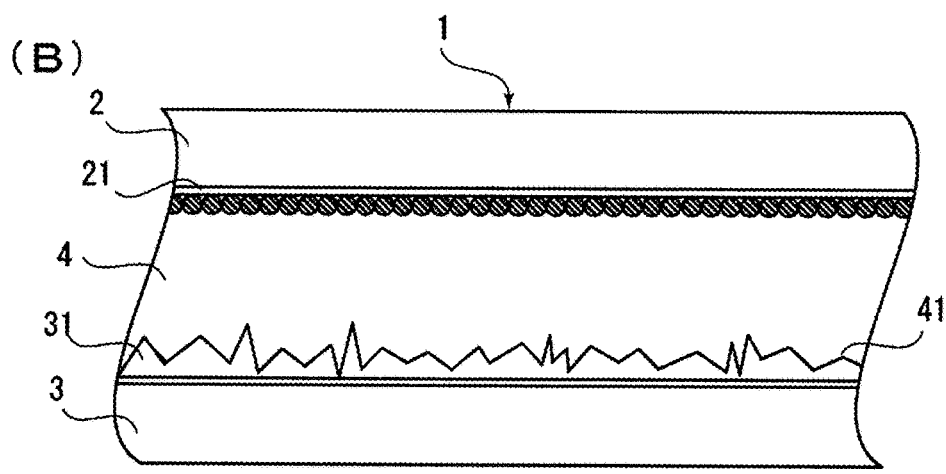

transmissible state mirror state (-2.5 V)

LIGHT CONTROL METHOD FOR LIGHT CONTROL ELEMENT

TECHNICAL FIELD

The present invention relates to a light control method for a light control element. More specifically, the present invention relates to a light control method for a light control element such as a display device, a light control filter that controls the amount of light irradiated from outside, an anti-glare mirror, and the like, in which light can be controlled by including electrochromic material to vary the light property thereof.

BACKGROUND ART

An element that controls the amount of light transmission for a display device, a light control filter, and the like, is sold in a market.

A device for displaying information (a display device) such as a television, a monitor for a personal computer, and a display for mobile phone is one of the essential devices in recent information society. A light control filter that controls the amount of light irradiated from outside, an anti-glare mirror, and the like have a similar effect to a curtain being capable of controlling the light irradiated from outside in a space of a house, car, airplane, etc. Thus, they are very useful in life.

A display type of a display device can be generally divided into a reflection type, a transmission type, and a light emission type. A person who manufactures a display device generally selects a preferable display type for manufacturing a display device by assuming an environment of usage for a display device.

Recently, the portability of a display device has been enhanced by miniaturizing and thinning a display device, so that a display device has been often used in an environment of different brightness levels and demands of users for a display device have been also diversified. As a mode for a display device, for example, a mirror surface state of a display screen as well as a bright state and a dark state has been demanded. This is the same as a light control filter, and the like.

As a related technology, for example, an electrochromic mirror in which a mirror layer is formed on one substrate of a pair of substrates is disclosed in patent document 1 described below.

RELATED ART REFERENCE

Patent Reference

Patent document 1: Japanese Unexamined Patent Application Publication No. 10-500225

DESCRIPTION OF THE INVENTION

However, there is a problem with the display device disclosed in the patent document 1 in that a mirror layer is fixed, a mirror surface of an electrochromic display element is merely changed, usage of a display device is not considered, and even if considered, the usage of a display device is limited to only a reflection type. Furthermore, in the display device, multicolor displaying is not considered at all.

Thus, in consideration of the above-described problem, it is an object of the present invention to provide a light control method for a light control element that can be used for a transmission type, that has a high-quality mirror surface state for high contrast ratio and that can be capable of multicolor displaying.

Means for Solving the Problems

A light control method for a lighting control element of one aspect according to the present invention comprises a pair of substrates, a pair of electrodes which are formed on opposed surfaces of the pair of substrates, and an electrolyte layer sandwiched between the pair of electrodes and including an electrochromic material containing silver and a mediator, the applied voltage to be applied between the pair of electrodes is changed in one light control period.

Effects of the Invention

Therefore, in the present invention, provided are a light control method for a light control element that can be used for a transmission type, that has a high-quality mirror surface state for a high contrast ratio and that can be capable of multicolor displaying.

BRIEF DESCRIPTION OF THE DRAWINGS

FIG. 2 is a drawing showing an image of the displaying state of a display device according to one embodiment of the present invention.

FIG. 4 is a drawing showing an image of the displaying state of a display device according to one embodiment of the present invention.

BEST MODE FOR CARRYING OUT THE PRESENT INVENTION

Hereinafter, the embodiments of the present invention are described with reference to the drawings. However, the present invention can be accomplished with different embodiments and is not limited to the embodiments described below.

Figure 1:
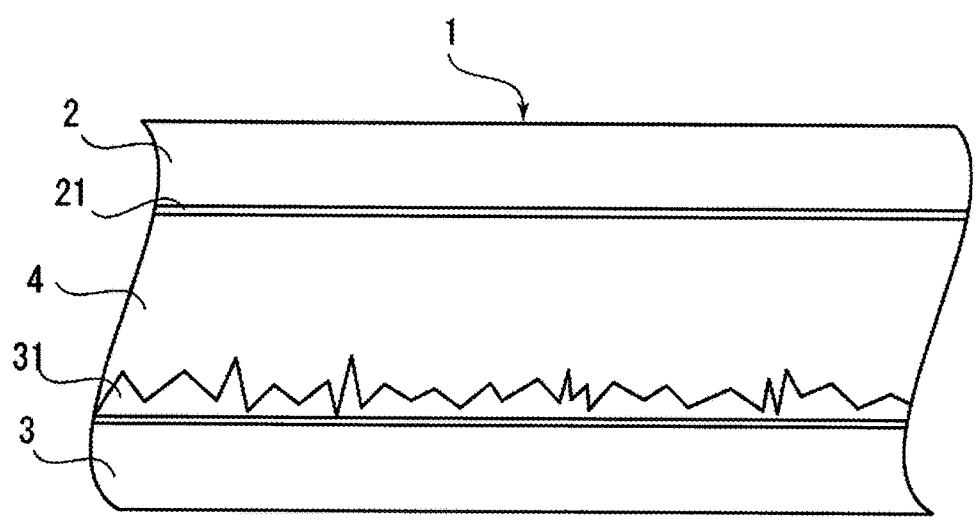
FIG. 1 is a drawing schematically showing a cross-sectional view of a display device according to one embodiment of the present invention.

FIG. 1 is a drawing schematically showing a cross-sectional view of a display device 1 (hereinafter, referred to as "the present display device") according to one embodiment that is one example of a light control element of the present invention. As shown in FIG. 1, the present display device 1 comprises a pair of substrates 2, 3, a pair of electrodes 21, 31 formed on opposing surfaces of the pair of substrates 2, 3, and an electrolyte layer 4 including an electrochromic material that contains silver and a mediator. The electrolyte layer 4 is sandwiched between the pair of electrodes 21, 31.

The pair of substrates 2, 3 according to one embodiment of the present invention is used for the electrolyte layer 4 being maintained and sandwiched therebetween. At least one of the pair of substrates 2, 3 may be transparent. When both the substrates 2, 3 are transparent, a display device for a transmission type can be realized. In the present embodiment, a case in which both the pair of substrates 2, 3 are transparent is used. Moreover, the material for the substrates 2, 3 is not limited as far as the substrates 2, 3 have a useful hardness and chemical stability, and maintain a material layer. Glass, plastics, metal, semiconductor, etc. may be employed. Glass or plastics may be used as a transparent substrate.

Furthermore, in the present embodiment, electrodes 21, 31 are formed on opposing surfaces (inner surfaces) of each of the pair of substrates 2, 3. The electrodes 21, 31 are used for applying a voltage to the material layer sandwiched between the pair of substrates 2, 3. As a material of the electrodes 21, 31, it is not limited as long as electric conductivity is preferably maintained. Not specifically defined, when the substrate is transparent, for example, the electrode may be at least one of ITO, IZO, $SnO_2$, ZnO, and the like.

Moreover, in the present embodiment, one of the electrodes 21, 31 is preferably a particle-modified electrode on which relatively large depressions and protrusions are formed, the particle-modified electrode having a transparency and a conductivity. The other of the electrodes 21, 31 is preferably a smooth electrode. Herein, the particle-modified electrode means an electrode in which a particle is fixed to a surface thereof and relatively large depressions and protrusions of the nanometer-scale order is formed thereon. The size of the depressions and protrusions on the particle-modified electrode is not limited. The difference of elevation of depressions and protrusions (difference of maximum height and minimum height thereof) is preferably 50 nm or more and 500 nm or less, and more preferably 100 nm or more and 500 nm or less. For example, this can be accomplished by particles being arranged and fixed thereto, the particle size being preferably 50 nm or more and 500 nm or less, and being more preferably 100 nm or more and 500 nm or less. Not specifically defined, examples of the materials for the particles include ITO, IZO, titanium oxide, NiO, etc. The material for the particles is preferably ITO or IZO, and more preferably ITO because the conductivity is completely obtained. No depressions and protrusions are formed on the smooth electrode. Even though depressions and protrusions exist on the smooth electrode, the size thereof is under the nanometer-scale order. Not specifically defined, the difference of elevation thereof is preferably 20 nm or less, more preferably 10 nm or less, still more preferably 5 nm or less. As the material for the smooth electrode, material similar to the particle-modified electrode may be employed.

Furthermore, in the present embodiment, the surface roughness (Ra) of the particle-modified electrode measured of the stylus type is preferably 100 nm or more and 400 nm or less, more preferably 50 nm or more and 400 nm or less. By the surface roughness being maintained within these ranges, a dark state described later can be realized. The surface roughness of the smooth electrode is preferably under the above-mentioned ranges. The surface roughness (Ra) of the smooth electrode measured of the stylus type is specifically 20 nm or less, preferably 10 nm or less and more preferably 5 nm or less. By the surface roughness being maintained within these ranges, a mirror state described later can be realized.

Electrodes 21, 31 according to the present embodiment may be formed on the substrates 2, 3, the electrodes 21, 31 may be a form that matches a pattern such as a character to be displayed, and the electrodes 21, 31 may be formed to align an electrode pattern on a plurality of substrates, the electrode pattern being divided into each of a plurality of regions with the same size. When the electrode pattern is divided into each of the plurality of regions, each of the plurality of regions becomes a pixel, and each of the pixels is controlled for display, the display being obtained with a complex form.

The distance between the electrodes 21, 31 is not limited as far as silver is sufficiently deposited as fine particles in the electrochromic material described later and an electric field that disappears is applied. For example, the distance therebetween is preferably 1 micrometer or more and 10 mm less, and more preferably 1 micrometer or more and 1 mm or less.

The electrodes 21, 31 according to the present embodiment are connected to a power supply via wirings that have their own conductivities. By modifying the voltage that is supplied by the power supply, applying a voltage or applying no voltage to the material layer can be controlled. Then the light control method of this embodiment can be realized.

An electrolyte layer 4 according to the present embodiment includes an electrolyte as a supporting salt, and also includes an electrochromic material and a mediator, the electrochromic material containing silver. Moreover, the electrolyte layer 4 according to the present embodiment also includes a solvent for maintaining the electrochromic material containing silver ion, and the mediator.

Electrolyte in the electrolyte layer 4 according to the present embodiment facilitates oxidation-reduction reactions of the electrochromic material. For example, the electrolyte is preferably supporting salt, and preferably includes a bromide ion. Examples thereof include LiBr, KBr, NaBr, tetrabutylammonium bromide (TBABr), etc. Not specifically defined, the concentration of the electrolyte is about five times as much as that of the electrochromic material by molar concentration. Specifically, the concentration of the electrolyte is three to six times as much as that of the electrochromic material. For example, the concentration of the electrolyte preferably is 3 mM or more and 6 M or less, more preferably 5 mM or more and 5 M or less, more preferably 6 mM or more and 3 M or less, more preferably 15 mM or more and 600 mM or less, more preferably 25 mM or more and 500 mM or less, and more preferably 30 mM or more and 300 mM or less.

A solvent according to the present embodiment is not limited as far as electrochromic material 41, electrochemical light emission material and electrolyte are stably maintained. For example, the solvent is a polar solvent such as water or a non-polar organic solvent. Not specifically defined, the solvent may be DMSO.

An electrochromic material according to the present embodiment causes oxidation-reduction reactions by applying direct current voltage and is preferably a salt that includes silver ion. Fine silver particles are deposited or disappear by the oxidation-reduction reactions of the electrochromic material, thereby generating a change of color to form a display. Not specifically defined, examples of the electrochromic material containing silver include $AgNO_3$, $AgClO_4$, AgBr, etc. The concentration of the electrochromic material is not limited as far as the above-mentioned function is accomplished. The concentration of the electrochromic material depends on the type of material and may be preferably adjusted. The concentration thereof is preferably 5 M or less, more preferably 1 mM or more and 1 M or less, and still more preferably 5 mM or more and 100 mM or less.

A mediator according to the present embodiment is a material capable of carrying out oxidation-reduction reactions in which the electrochemical energy of the mediator is lower than that of silver. The color disappearing reaction due to oxidation can be assisted by an oxidant of the mediator receiving electrons from silver and giving electrons to silver at all times. The mediator is not limited as far as the above-mentioned function is accomplished. For example, the mediator is preferably a salt of copper (II) ion. More specifically, examples of the mediator include $CuCl_2$, $CuSO_4$, and $CuBr_2$. The concentration of the mediator is not limited as far as the above-mentioned function is accomplished. The concentration of the mediator depends on the type of material and may be preferably adjusted. The concentration thereof is preferably 5 mM or more and 20 mM or less, and more preferably 15 mM or less. The concentration of 20 mM or less prevents excessive coloring. The ratio of silver ion concentration to copper (II) ion concentration is not limited. However, when the silver ion concentration is 10, the copper (II) ion concentration is preferably 1 or more and 3 or less.

In the present embodiment, besides the above-mentioned condition, a thickening agent may be added. The memory property of an electrochromic element can be enhanced by adding the thickening agent. Not specifically defined, an example of the thickening agent is polyvinyl alcohol. Not specifically defined, the concentration of the thickening agent is preferably 5 wt % or more and 20 wt % or less with respect to the total amount of the electrolyte layer 4.

Incidentally, in the light control method for the display device according to the present embodiment (hereafter, referred to "the present light control method"), the voltage is applied between the pair of electrodes of the display device. In one light control period, the applied voltage is a constant voltage, in the other light control period, the applied voltage is modified. Here, "light control period" means a period for carrying out a light control state (in this embodiment, it means a displaying state), specifically, it means a period for displaying a static image. Incidentally, in the case for displaying a video, since the video is composed of a number of static images in series, each period for displaying each static image is interpreted as the light control period. By adopting the voltage application, the light control method according to the present embodiment can carry out the transparent state, the dark state, and the mirror state. Further, the present light control method can carry out the color state of red or blue, etc.

First, the present light control method carries out the dark state, the mirror state or the transparent state, in each light control period by applying a constant voltage or cancelling the applied voltage. FIG. 2 is a drawing showing an image of the displaying state of a display device according to one embodiment of the present invention.

In the present display device, when a voltage is applied between the pair of electrodes, silver ions in the electrochromic material are reduced and silver is deposited on the electrode. Further, when the voltage is canceled, the silver becomes silver ions and dissolves in the electrochromic material. In this case, when silver is deposited on the flat electrode, the state will be the mirror state. And when silver is deposited on the particle-modified electrode, the state will be the dark state. In this case, for an observer, the substrate in which the flat electrode is formed is the front side, and the substrate in which the uneven electrode is formed is the rear side. The magnitude of direct current voltage is adjustable by the distance between the pair of substrates or the distance between the pair of electrodes. Specifically, a range of electric field from $1.0 \times 10^3$ V/m to $1.0 \times 10^5$ V/m (absolute value) is desirable, and a range of field from $1.0 \times 10^3$ V/m to $1.0 \times 10^4$ V/m (absolute value) is more desirable.

Further, in the present light control method, the applied voltage between the pair of substrates is modified in one light control period. More specifically, when the depositioned silver particles on a flat electrode is the side to be in the mirror state, the value of the applied voltage in a stepwise light control period unit particle size of the silver to be precipitated can be modified to cause not only the display state to be the mirror state, it is possible to realize a blue state and a colored state such as a red state. There is also unclear part principle the colored state appears, the plasmon absorption wavelength range by the particle size of the silver is adjusted is limited, color changes from localized surface plasmons, it will have a specific color only I believed. In addition the light control method, even when varying the applied voltage in the light control period, by modifying the fact and its application time is made different from that in the amount of other dimming period of the change, and dimming the varied particle size of the silver to be deposited on the electrode in each period, it is possible to vary the colors to be displayed. Namely, the multi-color display will be carried out by modifying the displaying period.

Figure 3:
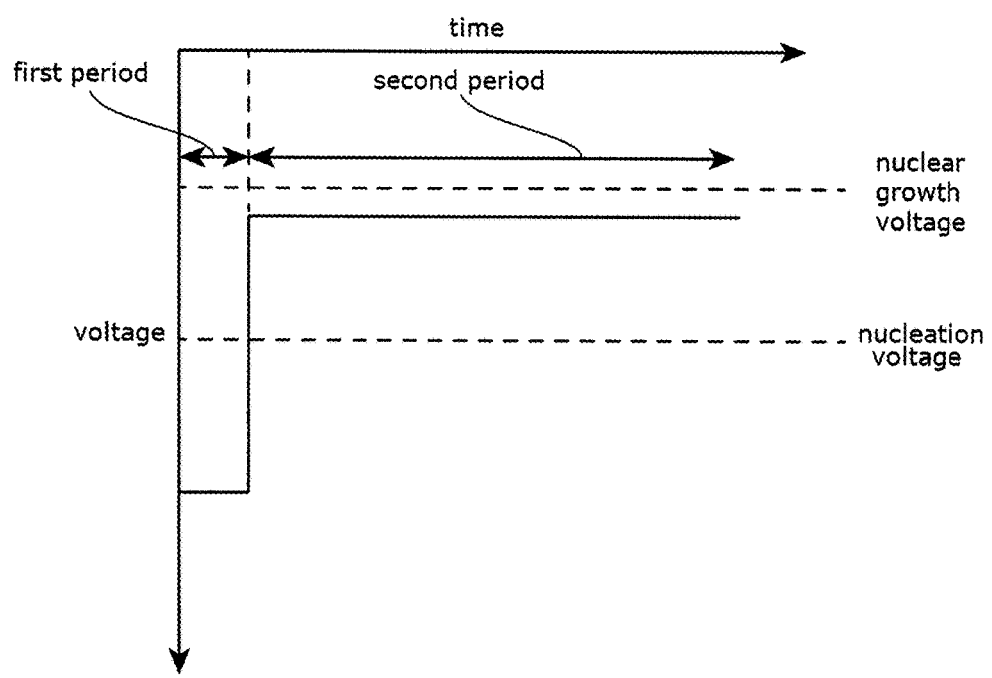
FIG. 3 is a drawing showing an image of the voltage which is applied to a display device according to one embodiment of the present invention.

Further, in the present light control method, a so-called double-pulse is desirable as a means for modifying the parameter of the applied voltage. In the double pulse, the voltage is modified stepwise. FIG. 3 shows an image of the voltage which is applied between the electrodes. FIG. 4 shows an image of the difference of the displaying states by the difference in the applied voltage. In FIG. 4, (A) means the mirror state and (B) means the color state. In (A), the particles are fully larger and the mirror state is carried out. Meanwhile, in (B), since the size of each particle is similar, the state is the color state. By this means, the nucleation starts in the first period and the nuclear growth starts in the second period. Namely, by dividing one light control period into some periods and modifying the value of the voltage, it is possible to adjust the diameter of the silver particles for the color state. The colors of the color state include blue or red. However, since the color is adjustable by modifying the diameter of silver particles, the colors are not limited to them.

Further, if the light control period is divided into periods, it is desirable that the absolute value of the voltage of the first period is larger than the absolute value of the voltage of the second period, and the length of the first period is shorter than the length of the second period. If the value of the voltage of the first period is larger and the length of the first period is shorter, the nucleation period can be efficiently distinguished from the nuclear growth period. Specifically, it is desirable that the absolute value of the voltage of the first period is larger than the absolute value of the nucleation voltage. Further, it is desirable that the absolute value of voltage of the second period is larger than the absolute value of the nuclear growth voltage and is lower than the absolute value of the nucleation voltage (see FIG. 3). In this case, more specifically, it is desirable that the absolute value of the voltage of the first period is larger by 1.5 times to 5 times than the absolute value of the voltage of the second period. Further, 3 times or less is more preferable. By this range, the value of the nucleation voltage and the value of the nuclear growth voltage will be clear, and it is possible to control the phenomenon with efficiency. Further, it is possible to modify only the color of the light control element by only modifying the ratio in each light control period. In this case, it is desirable that the first period is finished before the nucleation begins. Specifically, it is desirable that the length of the first period is 10 ms or longer and 1 s or shorter. Further, 500 ms or shorter is more desirable, and 200 ms or shorter is the most desirable. By the range, the nuclear produces with efficiency, and nucleation finishes before the nuclear grows. Further, the length of the second period is adjustable so far as nuclear growth is carried out. Specifically, it is desirable that the length is 1 s or longer and 3 s or shorter. Further, the length of the second period is adjustable so as to the nuclear growth is carried out. Specifically, it is desirable that the length of the second period is 1 s or longer and 3 s or shorter. By this range, the nuclear growth will be fully achieved. Further, in this case, it is possible that the first applied voltage and the length of the period is the same in every displaying period, and the length of the second applied voltage is modified in every period. By this modification, many colors will be obtained in each displaying period.

Hereinabove, the present embodiment provides a display device having a high-quality mirror surface state and high contrast ratio, the display device being used even as the transmission type. In particular, the present embodiment includes a mediator that causes oxidant-reduction reactions, the mediator having a lower energy than silver, so that excellent repetitive durability thereof is obtained. Thus, a light control element and a product having the light control element can be provided, the light control element having a high-quality mirror surface state and high contrast ratio, and the light control element being used even as the transmission type.

Further, in the present embodiment, by modifying the value of the applied voltage in a light control period, the mirror state, the dark state and the color state are realized. In particular, a multi-color display can be performed in the color state.

Further, in this embodiment, the mirror state, the dark state and the color state are carried out by using two electrodes, with one electrode being a flat electrode and the other electrode being an uneven electrode. The mirror state and the color state are carried out by using two flat electrodes.

Figure 5:
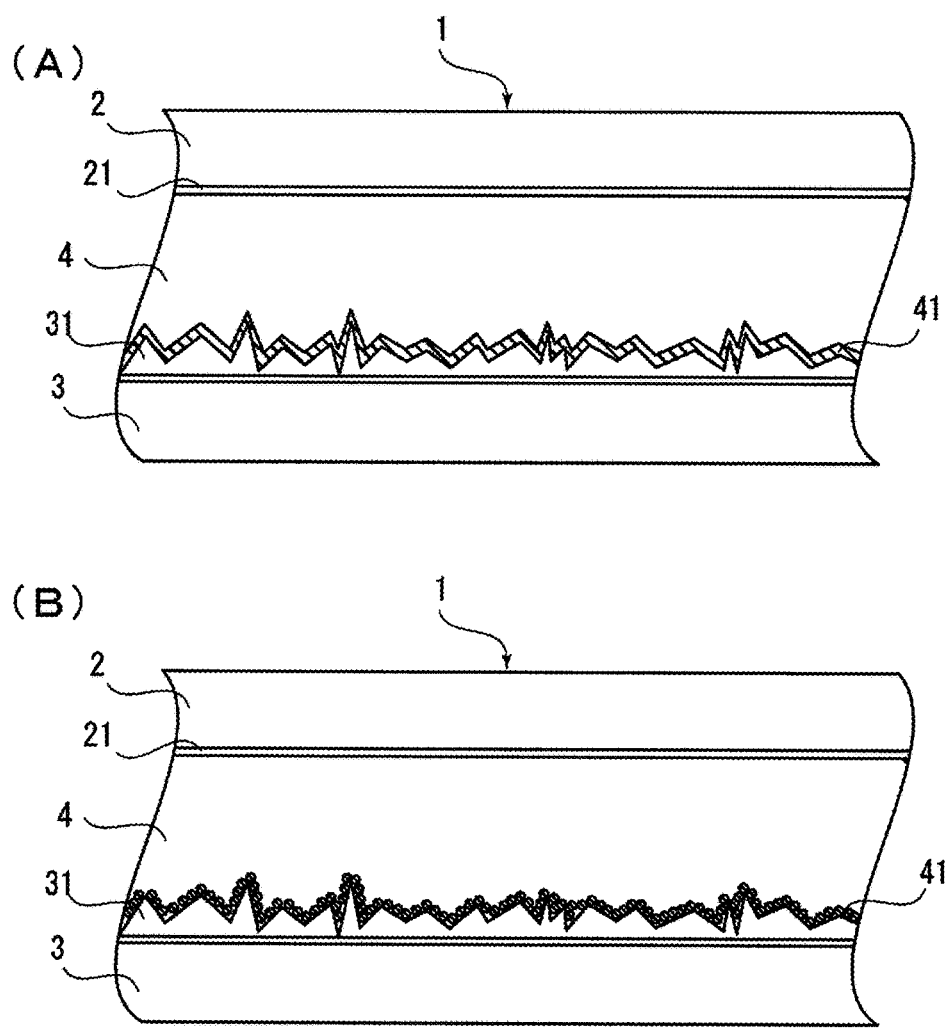
FIG. 5 is a drawing showing an image of the displaying state of a display device according to one embodiment of the present invention.

Further, in this embodiment, the applied voltage was modified in one light control period for depositing silver on the flat electrode. However, the applied voltage may be modified in one light control period for depositing silver on the uneven particle-modified electrode. In this case, the display device may express black as well as yellow and orange. FIG. 5 shows the image. In the figure, (A) shows the dark state and (B) shows the color state. In this case, the parameters of the first applied period, the second applied period, the first applied voltage and the second applied voltage are appropriately adjustable, respectively. The same range for the parameter of the flat electrode is adoptable. As a result of the above, various colors such as red, blue and yellow can be created.

Further, this embodiment shows a display device as an example of a light control element. The light control element is not limited to a display device. Specifically, the light control element is applicable to such as a light control window of a building, a shop window of a shop or a commercial architecture, a so-called smart window of a plane or a train, a mirror of a car or sunglasses, an information display medium in a public space such as a station, an airport or a bus stop. The light control element is applicable in many product fields which need light control.

Example 1

Herein, a display device is manufactured, and then the effects thereof are confirmed. The details are described below.

(Display Device 1)

Figure 6:
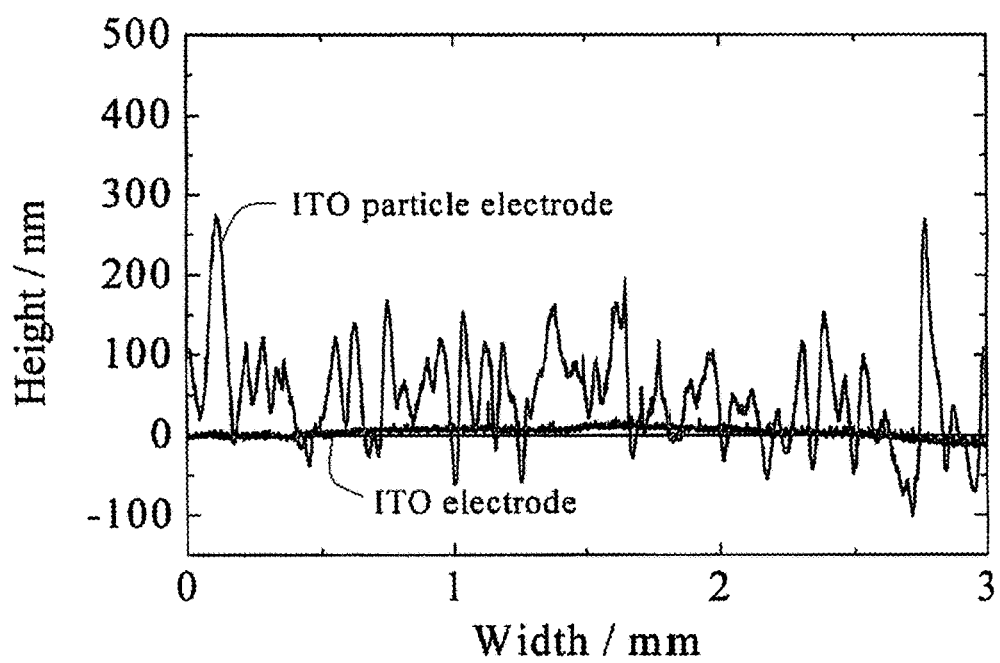
FIG. 6 is a drawing showing a surface profile of an ITO electrode and an ITO particle-modified electrode of a display device according to one example of the present invention.

A display device 1 was actually manufactured. The present display device has glass substrates as a pair of substrates, ITO electrodes as a pair of electrodes, $AgNO_3$ as an electrochromic material, DMSO as a solvent, TBABr as a supporting electrolyte (an antithesis reaction material), and $CuCl_2$ as a mediator. In this display device, one electrode is a flat ITO electrode. The other electrode is an ITO particle-modified electrode. The other electrode is formed by spin-coating (500 rpm×5 s, 1500 rpm×15 s) and annealing. The spin-coating uses an ITO dispersion liquid including ITO particles of which the diameter is 100 nm-300 nm. The temperature of the annealing is 250 degrees and the holding time is 1 hr. Further, the concentration of $AgNO_3$ is 50 mM, the concentration of TBABr is 250 mM, and the concentration of the mediator is 10 mM. Moreover, spacers were used for holding the thickness which is 500 micrometer between the pair of electrodes. The electrolyte layer was sandwiched between the pair of substrates. FIG. 6 shows the surface profile of the ITO electrode and the ITO particle-modified electrode. The surface profile was measured in a wide range of 3 mm width.

From the surface profile, it was found that the difference between the maximum height and the minimum height was about 400 nm in the uneven transparent particle-modified electrode.

Meanwhile, the difference between the maximum height and the minimum height is only 20 nm or less, in the flat electrode.

By the surface profile, it is confirmed that the surface roughness of the stylus type of the particle-modified electrode is 189 nm and that of the flat electrode is mm. Moreover, nano-order roughness is formed on the particle-modified electrode. Meanwhile, the roughness of the flat electrode is less than it. It is confirmed that the difference in the roughness is very big.

Figure 7:
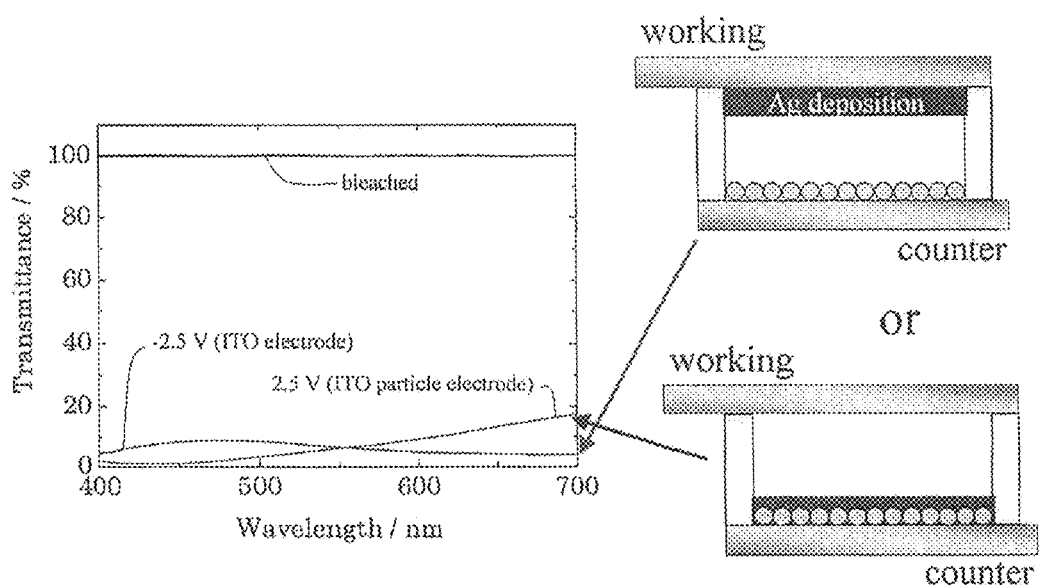
FIG. 7 is a drawing showing the results of the transmission spectrum measurements for a display device according to one example of the present invention.

The transmission spectrum measurement was carried out when the voltage from +2.5V to −2.5V was applied between the electrodes. FIG. 7 shows the result. According to the result, it is confirmed that the light was sufficiently cut off in each state of +2.5V and −2.5V. Further, it also is confirmed that the light was sufficiently transmitted in the achromatic period.

Figure 8:
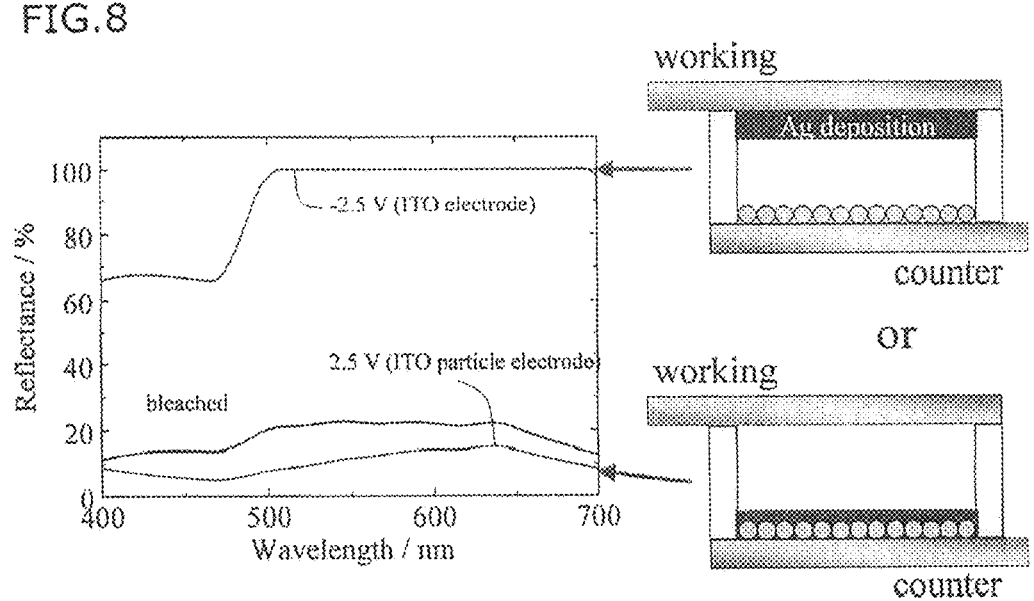
FIG. 8 is a drawing showing the results of the reflection spectrum measurements for a display device according to one example of the present invention.
Figure 9:
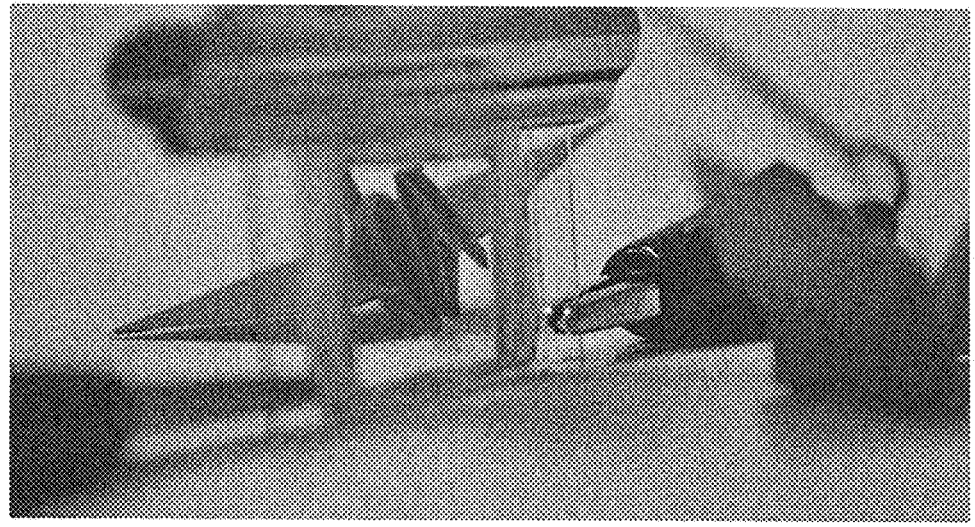
FIG. 9 is a photographic drawing showing a transmission of a display device according to one example of the present invention.
Figure 10:
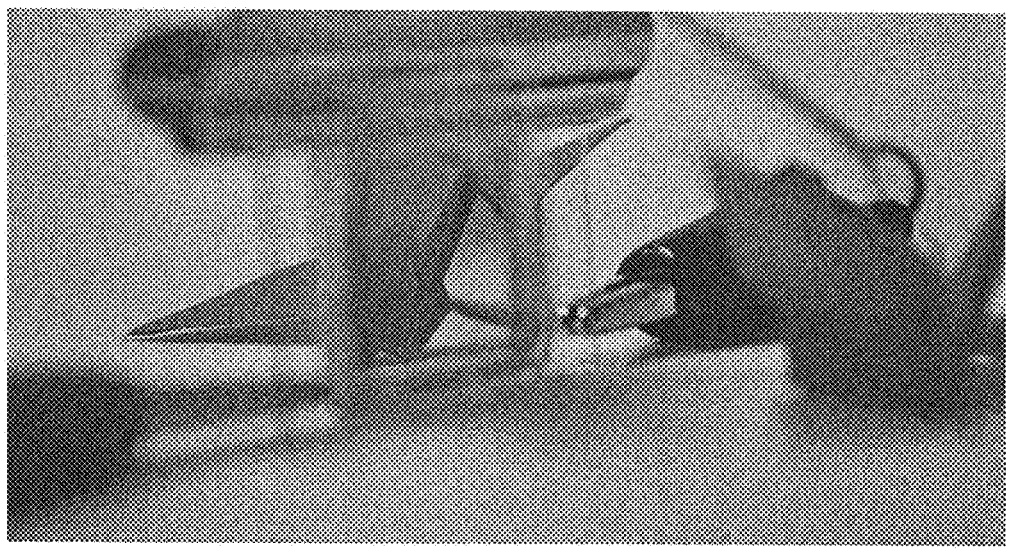
FIG. 10 is a photographic drawing showing a mirror state of a display device according to one example of the present invention.
Figure 11:
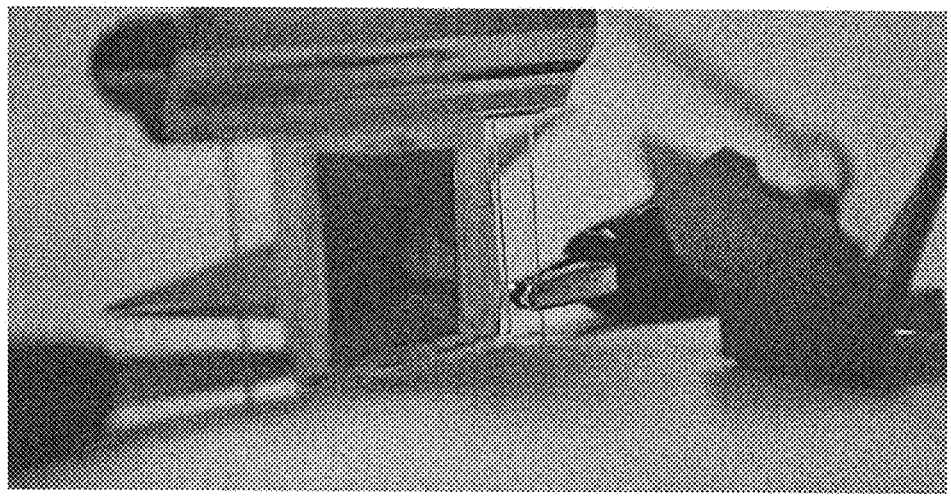
FIG. 11 is a photographic drawing showing a dark state of a display device according to one example of the present invention.

Further, the reflection spectrum in the case that the above voltage was applied was measured. The result is shown in FIG. 8. As a result, a good reflection characteristic was obtained at −2.5V. Meanwhile, a very poor reflection was obtained at +2.5V, and the state was the dark state. Thus, by the result above, it is confirmed that the reflection state and the mirror state is carried out at −2.5V, the dark state is carried out at +2.5V, and the transparent state is carried out at an achromatic period. FIGS. 9, 10 and 11 are the photographic drawing of each state. FIG. 9 shows the achromatic state, FIG. 10 shows the reflective state, and FIG. 11 shows the dark state.

Figure 12:
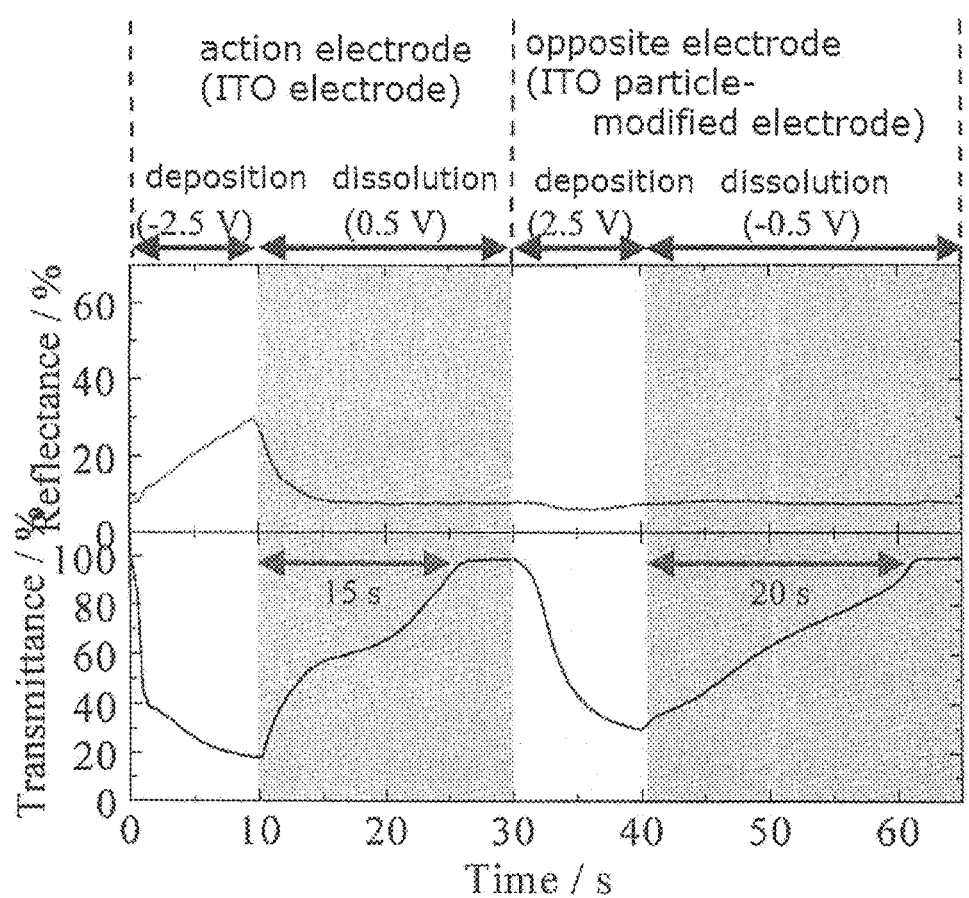
FIG. 12 is a drawing showing the transmission ratio and reflection ratio when the applied voltage is varied with respect to a display device 1 according to one example of the present invention.
Figure 13:
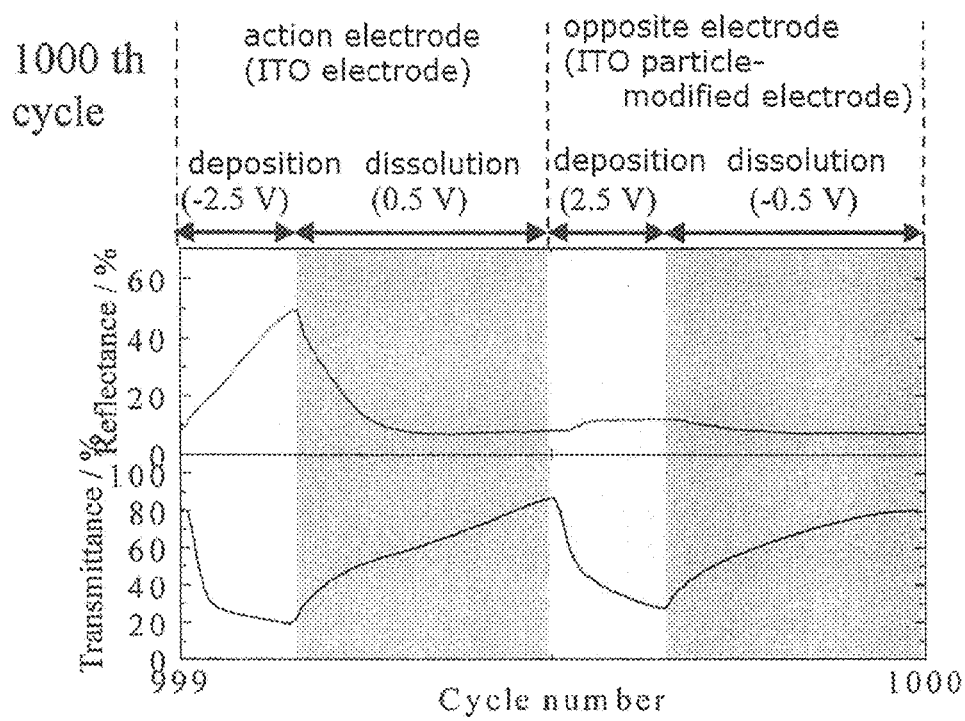
FIG. 13 is a drawing showing the transmission ratio and reflection ratio when the applied voltage is varied with respect to a display device 1 according to one example of the present invention.

FIG. 12 shows the transmittance and the reflectance of 700 nm, in the case of −2.5V for 10 s, 0.5V for 20 s, 2.5V for 10 s, and −0.5V for 20 s. By the result, in −2.5V, it was confirmed that since the reflectance was higher and the transmittance was lower, the state became the reflection state. In 0.5V, it was confirmed that since the reflectance was lower and the transmittance was higher, the state became the transmissible state. In 2.5V, it was confirmed that since the reflectance was lower and the transmittance was also lower, the state became the dark state. In −0.5V, it was confirmed that since the reflectance was lower and the transmittance was higher, the state became the transmissible state. The states were maintained after repeating 1000 times. FIG. 13 shows the result.

Figure 14:
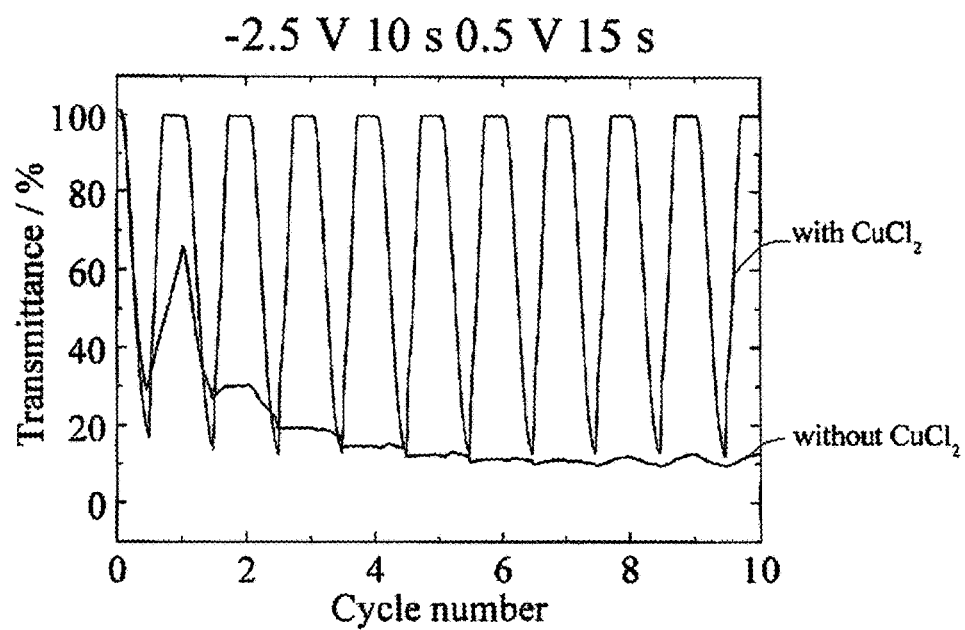
FIG. 14 is a drawing showing the transmission ratio and reflection ratio when the applied voltage is varied with respect to a display device 1 according to one example of the present invention.
Figure 15:
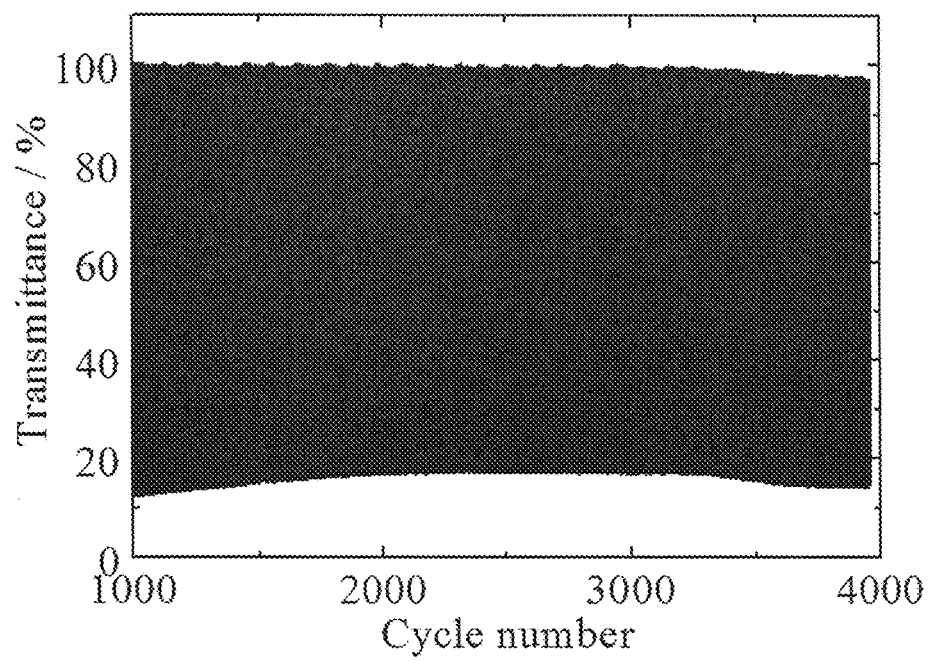
FIG. 15 is a drawing showing the transmission ratio and reflection ratio when the applied voltage is varied with respect to a display device 1 according to one example of the present invention.

The repetition characteristic of the display device of this example was confirmed. FIG. 14 and FIG. 15 shows the result. FIG. 15 shows the transmittance of 700 nm in the case of −2.5V for 10 s with 4000 repetition, and −0.5V for 15 s with 4000 repetition. FIG. 14 is the enlarged figure of FIG. 15 (about 10 repetition). As a comparative example, a display device without $CuCl_2$, was manufactured and the same measurements were carried out (see FIG. 14). By the result, it was confirmed that the display device has a high durability against repetition by including $CuCl_2$.

(Display Device 2)

Display device 2 was manufactured in the same way as the display device 1. The present display device has glass substrates as a pair of substrates, ITO electrodes as a pair of electrodes, $AgNO_3$ as an electrochromic material, DMSO as a solvent, LiBr as a supporting electrolyte (an antithesis reaction material), and $CuCl_2$ as a mediator. In this display device, one electrode is a flat ITO electrode. The other electrode is an ITO particle-modified electrode. The other electrode is formed by spin-coating (500 rpm×5 s, 1500 rpm×15 s) and annealing. The spin-coating uses an ITO dispersion liquid including the ITO particles in which the diameter is 100 nm-300 nm. The temperature of the annealing is 250 degree and the holding time is 1 hr. Further, the concentration of AgNO3 is 50 mM, the concentration of LiBr is 250 mM, and the concentration of the mediator is 10 mM. Moreover, the spacers were used for holding the thickness, which is 500 micrometers, between the pair of electrodes. The electrolyte layer was sandwiched between the pair of substrates.

Further, the step-voltage mode in which the applied voltage is modified in one light control period, and the constant-voltage mode are adopted. The constant-voltage mode adopted two voltage patterns, +2.5V and 20 s, or −2.5V and 20 s. The step-voltage mode adopted two voltage patterns. In each voltage pattern, the light control period was divided into two periods. In the first voltage pattern, the first applied voltage in the first period is −3.0V and 0.1 s, and the second applied voltage in the second period is −1.5V and 20 s. In the second voltage pattern, the first applied voltage in the first period is −3.0V and 0.1 s, and the second applied voltage in the second period is −1.5V and 5 s.

In the constant voltage mode, when the voltage was +2.5V and the period was 20 s, the silver was deposited on the ITO particle-modified electrode, and a dark state was realized. Meanwhile, when the voltage was −2.5V and the period was 20 s, the silver was deposited on the flat ITO electrode, and a mirror state was realized.

Figure 16:
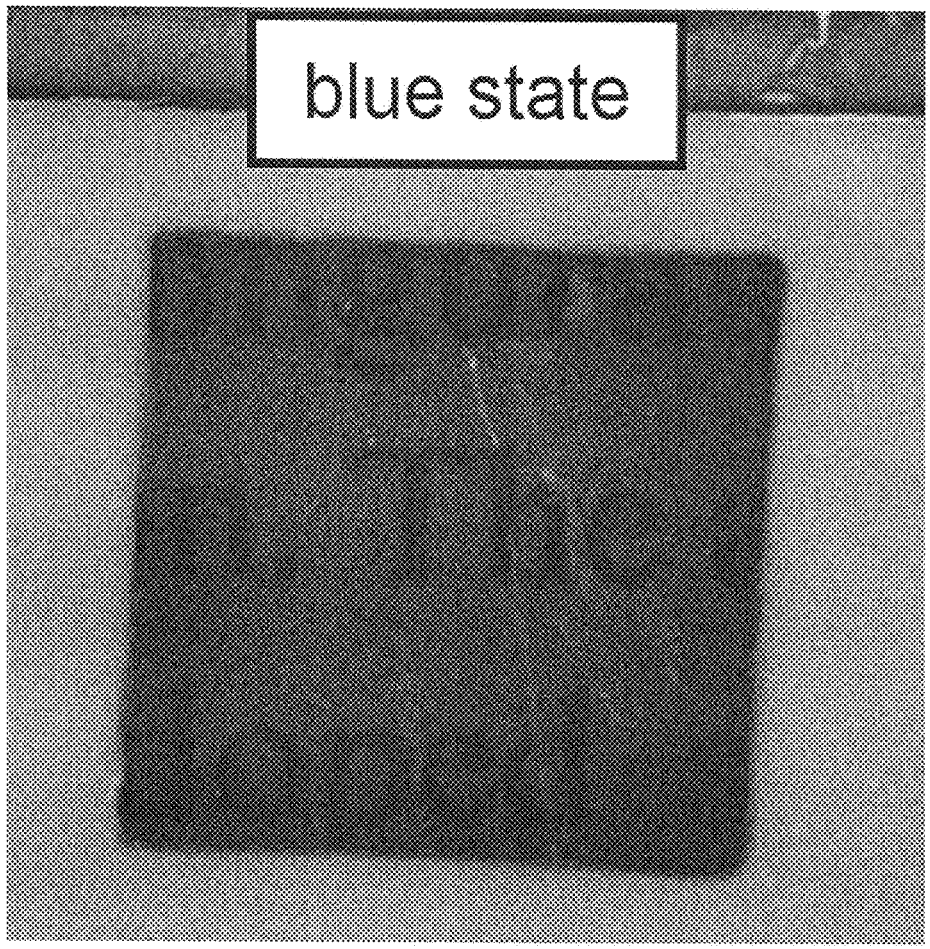
FIG. 16 is a drawing showing a displaying state when the applied voltage is applied to a display device 2 according to one example of the present invention.
Figure 17:
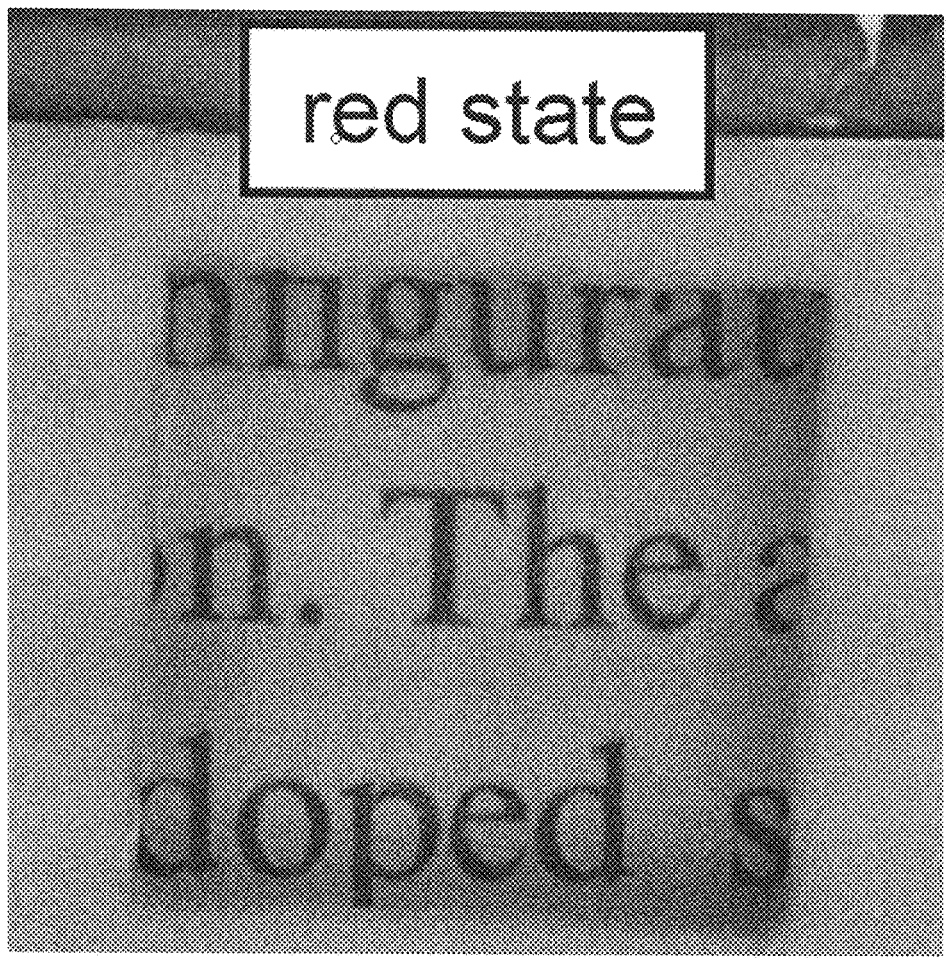
FIG. 17 is a drawing showing a displaying state when the voltage is applied to a display device 2 according to one example of the present invention.
Figure 18:
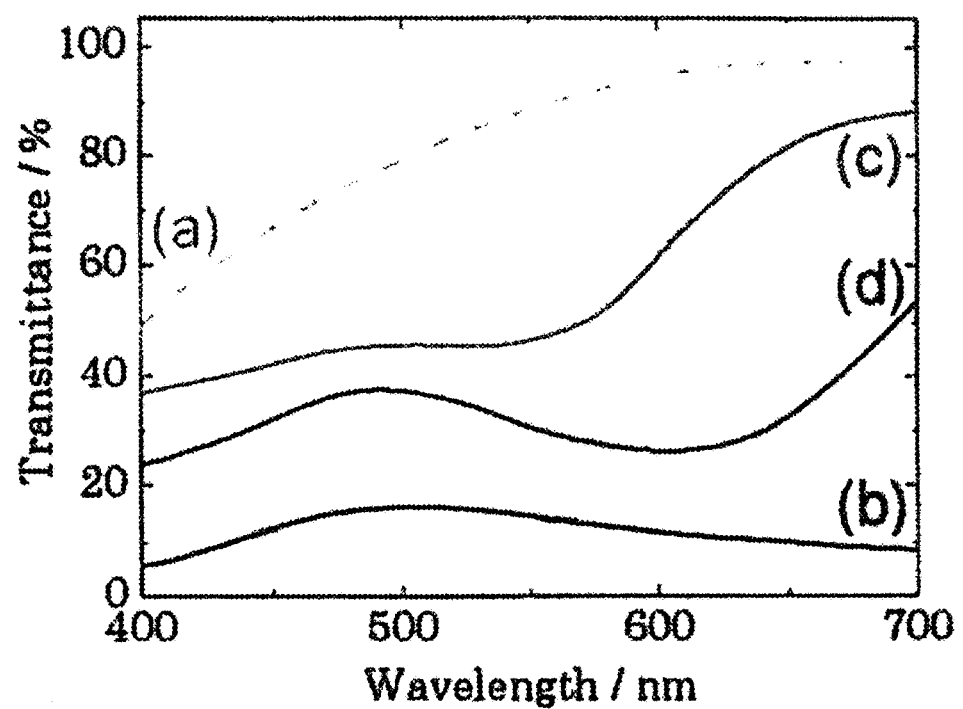
FIG. 18 is a drawing showing the transmission spectrum when the voltage is applied to a display device 2 according to one example of the present invention.
Figure 19:
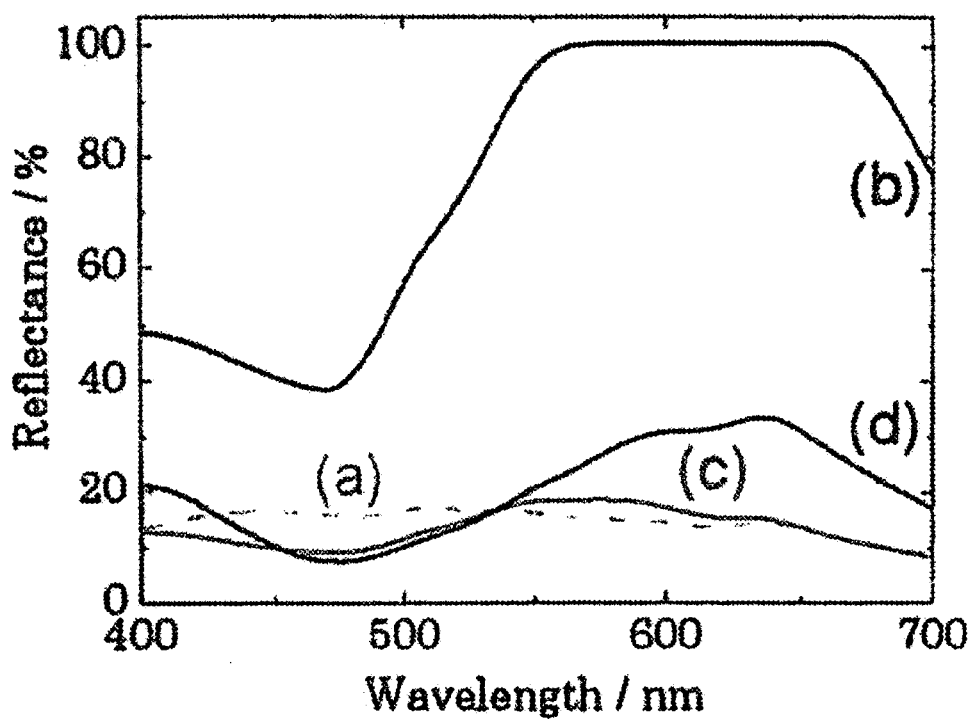
FIG. 19 is a drawing showing the reflection spectrum when the voltage is applied to a display device 2 according to one example of the present invention.
Figure 20:
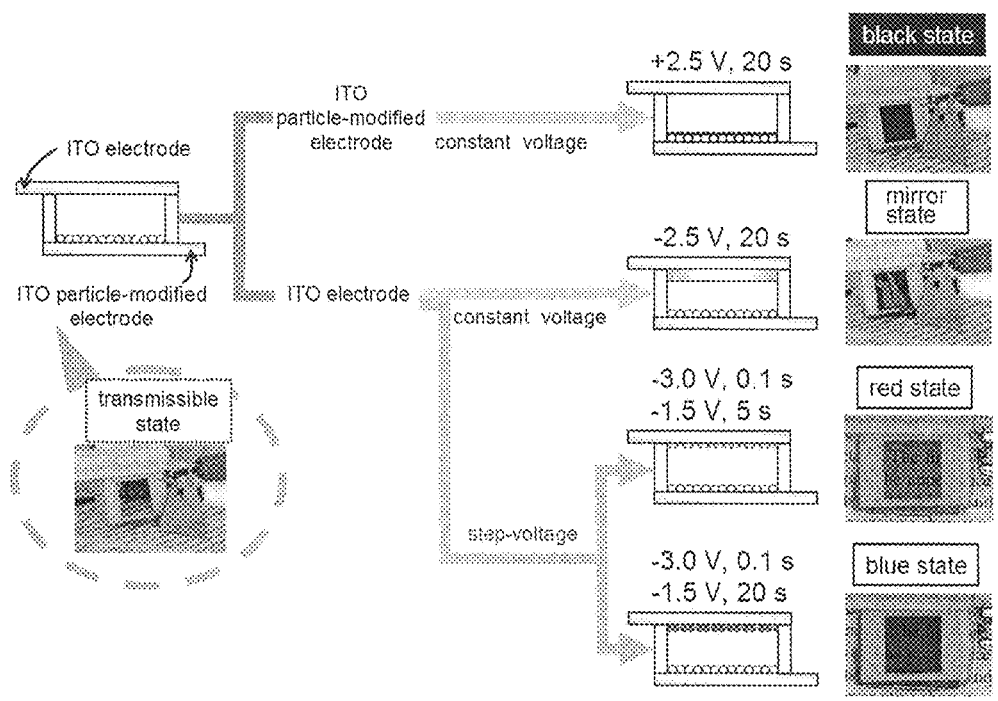
FIG. 20 is a drawing showing a summary of the displaying states when the voltage is applied to a display device according to one example of the present invention.
Figure 21:
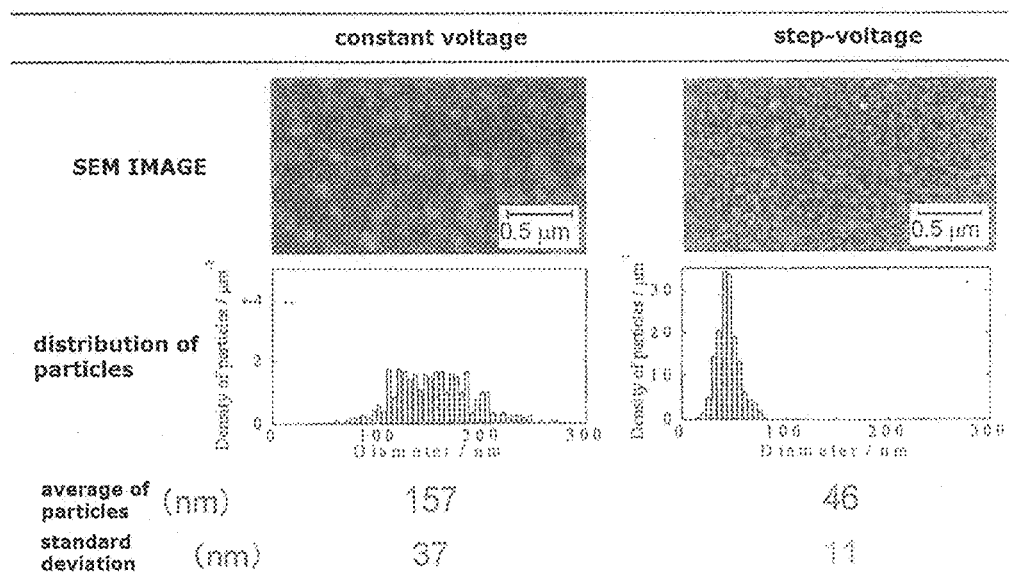
FIG. 21 is a drawing showing a SEM image of silver particles which are deposited on an ITO electrode and the particle size distribution of a display device 2 according to one example of the present invention.

In the case of the first voltage pattern of the step-voltage mode, silver was deposited on the flat ITO electrodes. However, the state was not the mirror state, but the blue color state. The display of the color state is shown in FIG. 16. Meanwhile, the color state became a red color state in the case of the second voltage pattern in the step-voltage mode. The display of the color state is shown in FIG. 16. The transmission spectrum is shown in FIG. 18. The reflection spectrum is shown in FIG. 19. FIG. 20 shows a summary of the results. In FIG. 18 and FIG. 19, (a) shows the condition with no voltage, (b) shows the constant voltage mode, (c) shows the second voltage pattern of the step-voltage mode, and (d) shows the first voltage pattern of the step-voltage mode. Namely, by the result, it is confirmed that the mirror state, the dark state and the color state will be carried out. Further, the color state contains a red state and a blue state. FIG. 21 shows the distribution of the particles, and the SEM image of the silver particles which are deposited on the ITO electrode in the constant voltage mode. Further FIG. 21 also shows the distribution of the particles, and the SEM image of the silver particles which are deposited on the ITO electrode in the step-voltage mode. By the figure, it is confirmed that the distribution of the particles is clearly different in the constant voltage mode and the step-voltage mode.

Figure 22:
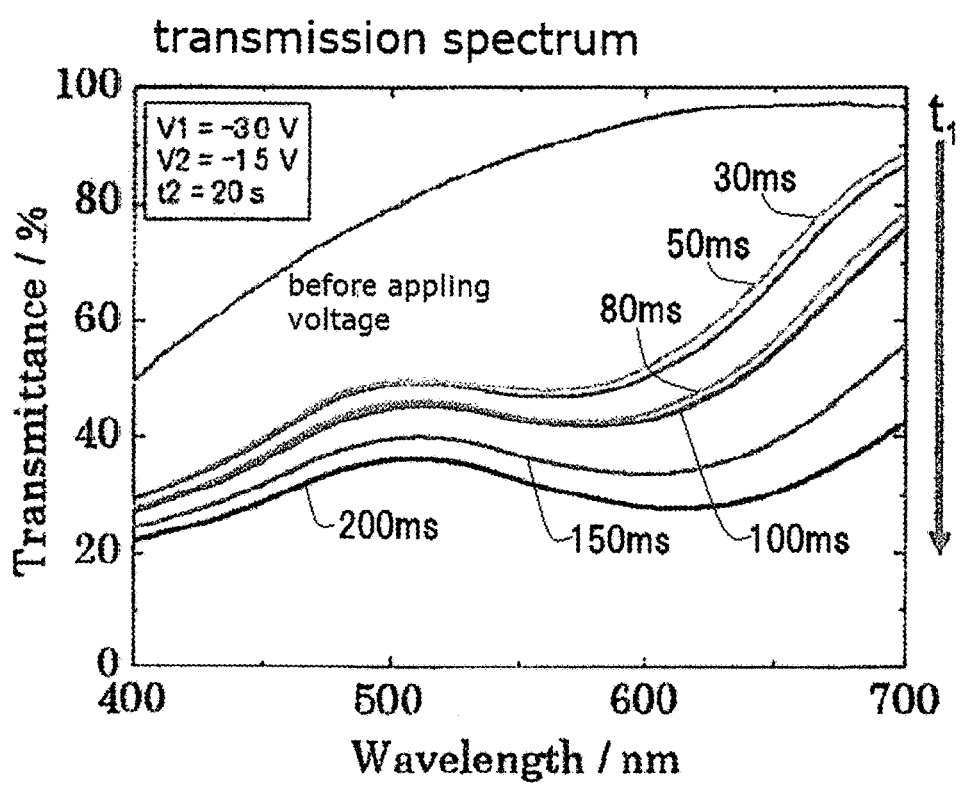
FIG. 22 is a drawing showing the transmission spectrum when the time period of the first applied voltage in step-voltage mode is varied with respect to a display device 2 according to one example of the present invention.

The effect of the change of the color by modifying the first period in the step-voltage mode was confirmed. Specifically, the transmission spectra were measured by modifying only the first period (30 ms, 50 ms, 80 ms, 100 ms, 150 ms, 200 ms). The result is shown in FIG. 22. In this figure, at 30 ms, the spectrum with high red intensity was obtained. At 200 ms, the absorbance of the wavelength of 700 nm became larger, and the bluish spectrum was obtained. Namely, it is confirmed that it is possible to modify the color by modifying the second period.

Figure 23:
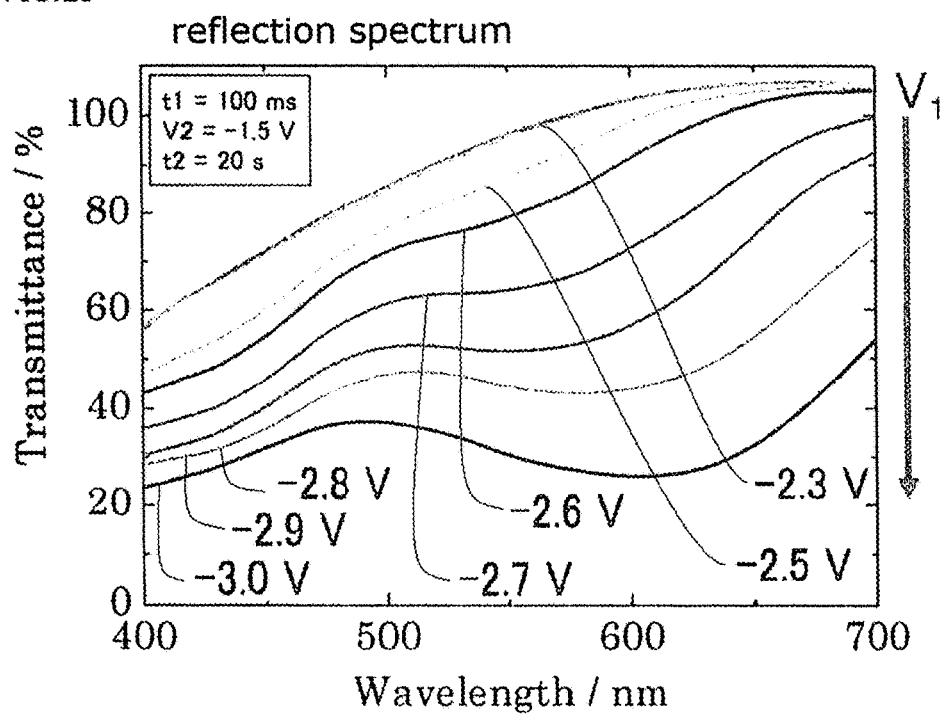
FIG. 23 is a drawing showing the transmission spectrum when the voltage value of the first applied voltage in the step-voltage mode is varied with respect to a display device 2 according to one example of the present invention.

Furthermore, with the present display device, the change of the color was measured when the second voltage was fixed at −1.5V and the first voltage of the first period in the first voltage pattern of step-voltage mode was changed (from −2.3V to −3.0V). FIG. 23 shows the change of the transmission spectrum. By the result, it is confirmed that various color states can be carried out if the applied voltage in the first period of each light control period is changed. Specifically, it is confirmed that the color changes from red to blue if the absolute value of the voltage becomes high (approaching to −3.0V).

Figure 24:
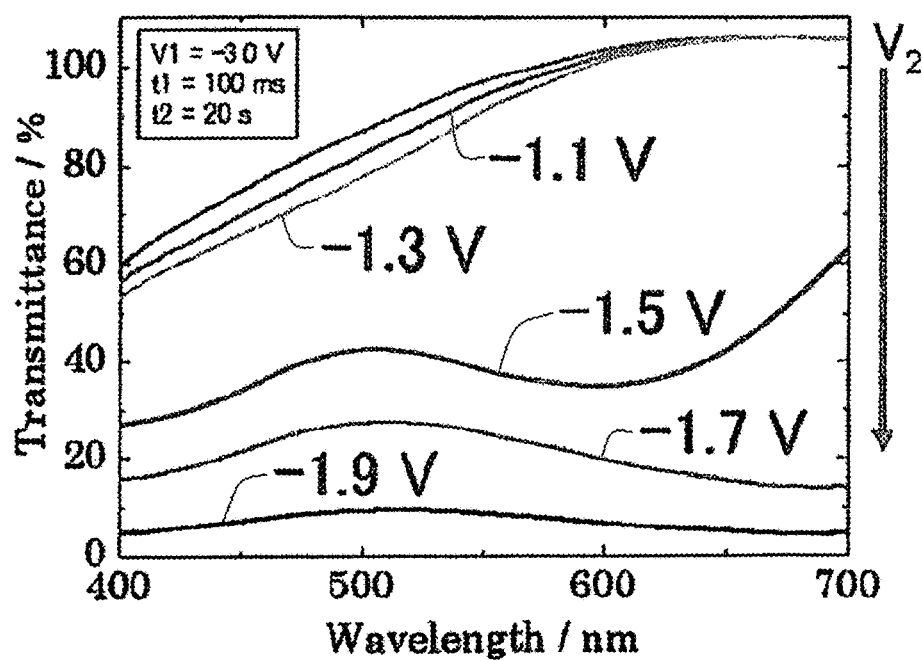
FIG. 24 is a drawing showing the transmission spectrum when the voltage value of the second applied voltage in the step-voltage mode is varied with respect to a display device 2 according to one example of the present invention.

Furthermore, with the present display device, the change of the color was measured when the first voltage was fixed at −3.0V and the second voltage of the second period in the first voltage pattern of step-voltage mode was changed (from −1.9V to −1.1V). FIG. 24 shows the change of the transparent spectrum. By the result, it is confirmed that various color states can be carried out if the applied voltage in the second period of each light control period is changed.

(Confirmation of the Color State)

Figure 25:
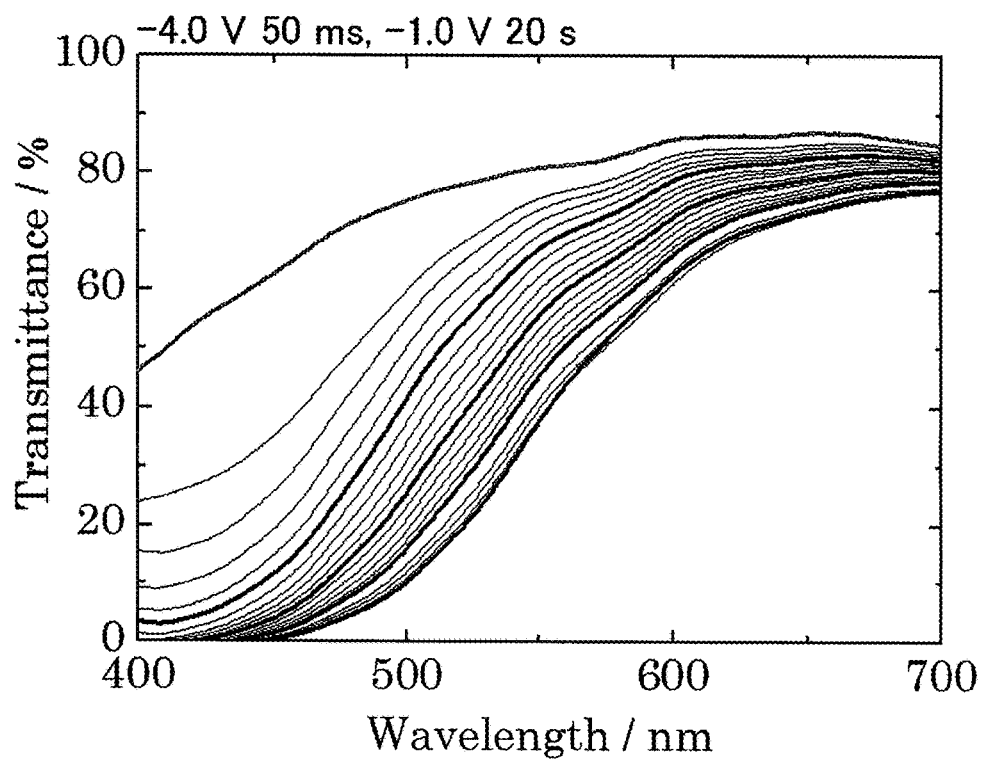
FIG. 25 is a drawing showing the change of transmittance when the second time period of the applied voltage is 20 s with regard to a display device 1 according to one example of the present invention.
Figure 26:
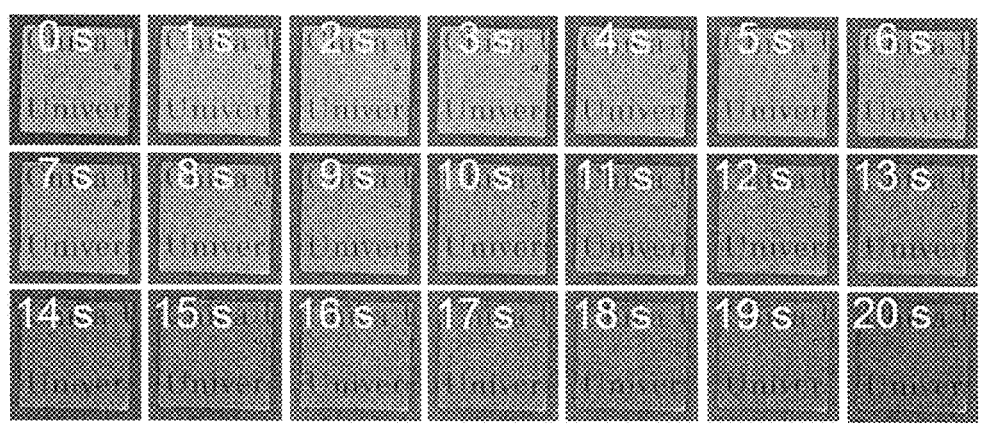
FIG. 26 is a drawing showing the display results of a display device 1 according to one example of the present invention.
Figure 27:
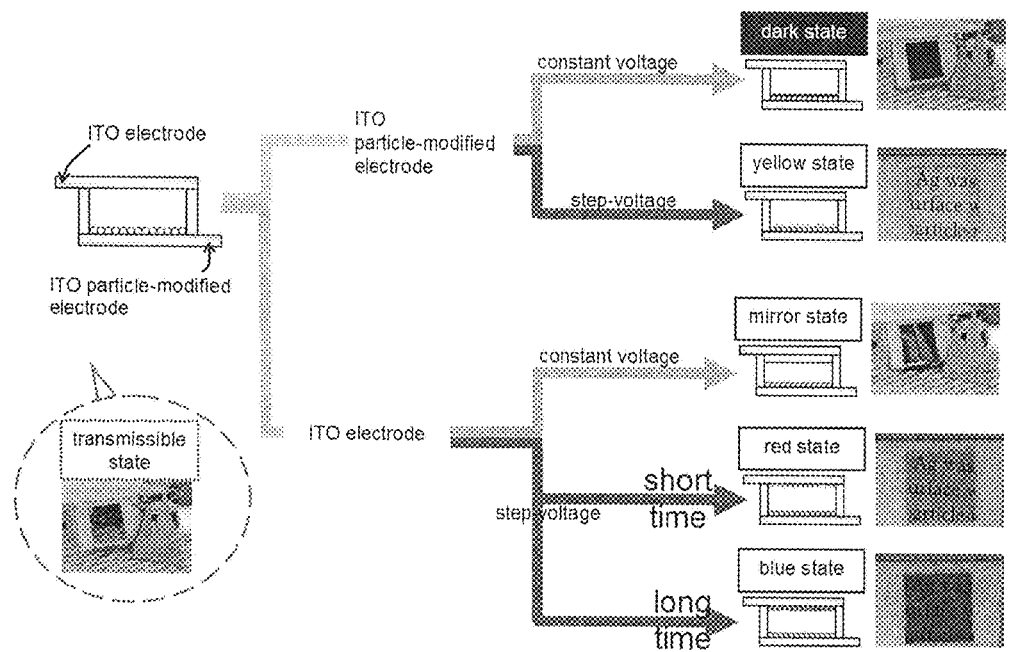
FIG. 27 is a drawing showing a summary of the displaying states when the voltage is applied to a display device according to one example of the present invention.

The voltage of the step-voltage mode was applied to the uneven transparent particle-modified electrode of the above-described display device 1. Specifically, one light control period was divided into two periods. In the first period, the applied voltage was 4.0V and the length was 50 ms. In the second period, the applied voltage was 1.5V and the length was from 0 s to 20 s. Then, the change was confirmed. FIG. 25 and FIG. 26 show the results of the transmittance and the displaying of the display device, respectively. Especially, FIG. 25 shows the transmittance of the case that the length of the second period was 20 s. By these figures, it is confirmed that the transmittance gradually decreased with time. Further, the absorbance near 400 nm became strong and the yellow became strong. Thus, it is also confirmed that when the applied period becomes long, the yellow becomes strong, gradually. And at 20 s, the color becomes an orange color. In short, the yellow color state appeared by applying a voltage of the step-voltage mode to the uneven transparent particle-modified electrode. As shown in FIG. 27, not only the mirror state and the dark state but also various colors such as red, blue and yellow will appear.

Hereinabove, based on the example, it was confirmed that a light-adjusting element including an electrochromic material and having a mirror surface display mode with a high reflection ratio, and a product containing the same could be obtained.

INDUSTRIAL APPLICABILITY

The present invention is industrially applicable as a display device.

DESCRIPTION OF REFERENCE NUMERALS

1 display device
2, 3 substrate
4 electrolyte layer

What is claimed is:

1. A light control method for a light control element, comprising:
   modifying the value of an applied voltage which is applied between a pair of electrodes in one light control period,
   wherein said light control element includes a pair of substrates, said pair of electrodes which are formed on said pair of substrates and an electrolyte layer which includes an electrochromic material and a mediator,
   said electrolyte layer is sandwiched by said pair of electrodes, and
   a color is changed by changing the diameter of silver particles which are deposited on at least one of the pair of electrodes every light control period.

2. A light control method for a light control element, comprising:
   modifying the value of an applied voltage which is applied between a pair of electrodes in one light control period,
   wherein said light control element includes a pair of substrates, said pair of electrodes which we formed on said pair of substrates and an electrolyte layer which includes an electrochromic material and a mediator,
   said electrolyte layer is sandwiched by said pair of electrodes, and
   one electrode of said pair of electrodes is an uneven transparent electrode having a surface unevenness on the order of nanometers.

3. The method according to claim 2,
   wherein said transparent electrode is a transparent particle-modified electrode.

4. The method according to claim 2,
   wherein one of said pair of electrodes is opposed to said uneven transparent electrode and is a flat transparent electrode.

5. The method according to claim 2,
   wherein the difference between the maximum height and the minimum height of the surface of said uneven transparent electrode of said light control element is 100 nm or more and 500 nm or less.

6. The method according to claim 2,
   wherein the surface roughness of said uneven transparent electrode of said light control element is a stylus surface roughness and 50 nm or more and 400 nm or less.

7. The method according to claim 2,
   wherein said mediator contains a contains copper (II) ion.

8. The method according to claim 2,
wherein the concentration of copper ion (II) of said mediator of said light control element is 1 to 3 when the concentration of silver ion of said electrochromic material is determined as 10.

9. The method according to claim 2,
wherein the concentration of said electrolyte of said light control element is 3 to 6 times of the concentration of said electrochromic material which is included in said electrolyte layer.

10. The method according to claim 2,
wherein said uneven transparent electrode contains at least one of ITO, IZO, $SnO_2$ and ZnO.

11. A light control method for a light control element, comprising:
modifying the value of an applied voltage which is applied between a pair of electrodes in one light control period,
wherein said light control element includes a pair of substrates, said pair of electrodes which are formed on said pair of substrates and an electrolyte layer which includes an electrochromic material and a mediator,
said electrolyte layer is sandwiched by said pair of electrodes, and
the diameter of silver particles deposited on at least one of the pair of electrodes is changed by changing the parameter of said applied voltage every light control period.

12. The method according to claim 11,
wherein different colors are displayed in each light control period, respectively.

13. The method according to claim 11,
wherein said value of said applied voltage is modified in stages in one light control period.

14. The method according to claim 13,
wherein at least one of the value of applied voltage and the period is modified every light control period.

15. The method according to claim 11,
wherein said electrolyte layer contains a thickener.

* * * * *